Jan. 17, 1950  C. DALBONI  2,494,609
CALCULATOR
Filed June 13, 1946  4 Sheets-Sheet 1
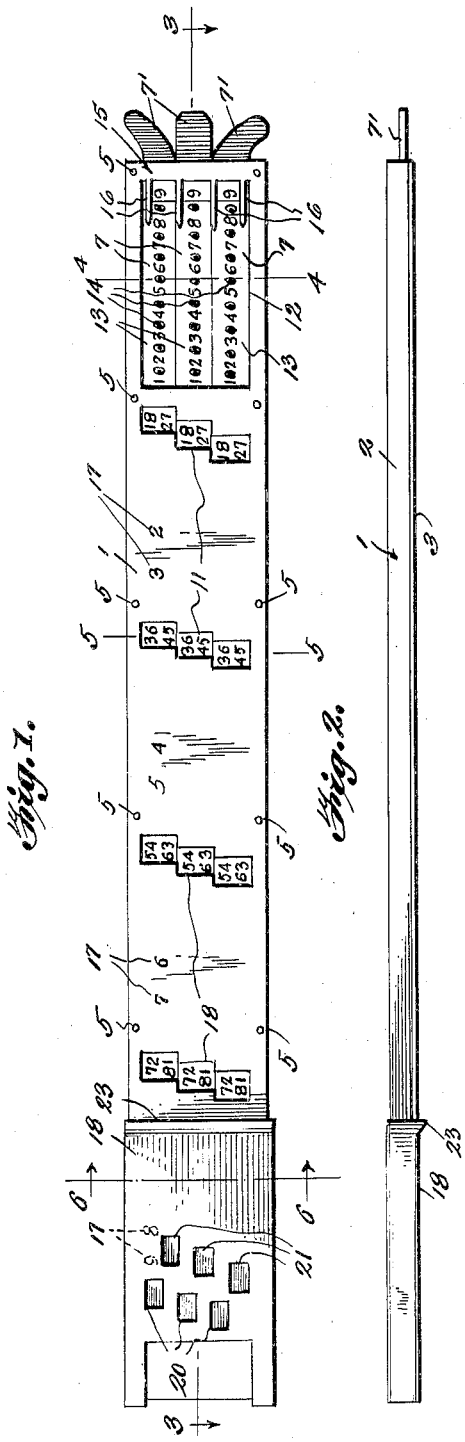
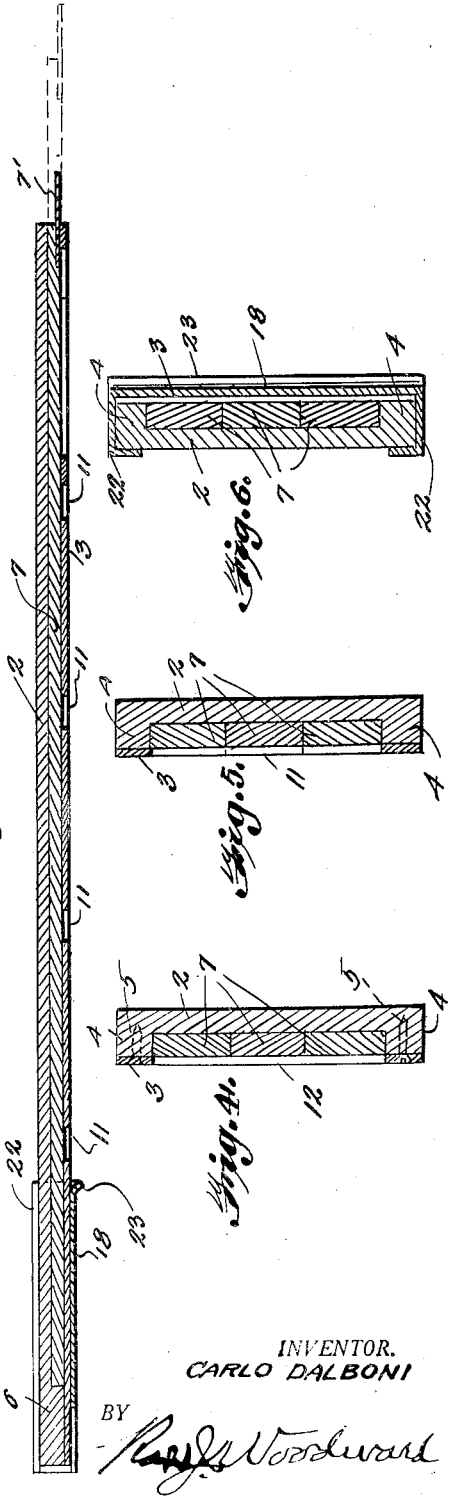
INVENTOR.
CARLO DALBONI Jan. 17, 1950     C. DALBONI     2,494,609
CALCULATOR Filed June 13, 1946     4 Sheets—Sheet 2

INVENTOR.
CARLO DALBONI
BY
Ross J. Woodward

Jan. 17, 1950     C. DALBONI     2,494,609
CALCULATOR
Filed June 13, 1946     4 Sheets-Sheet 3
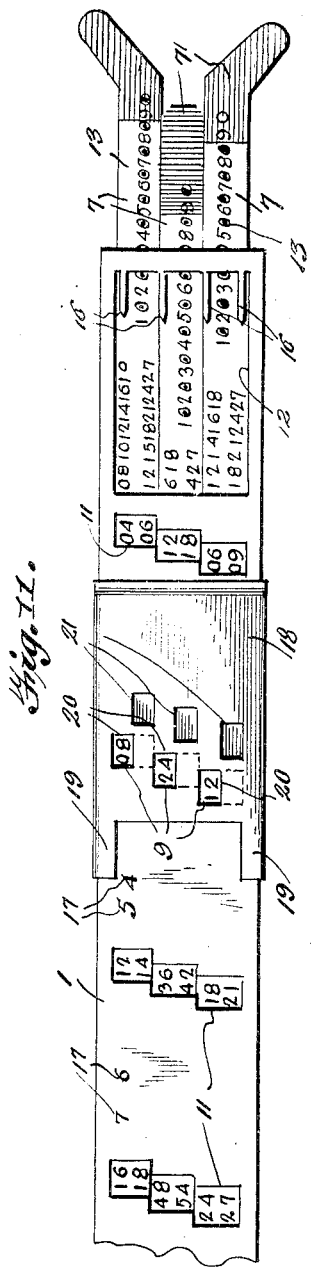
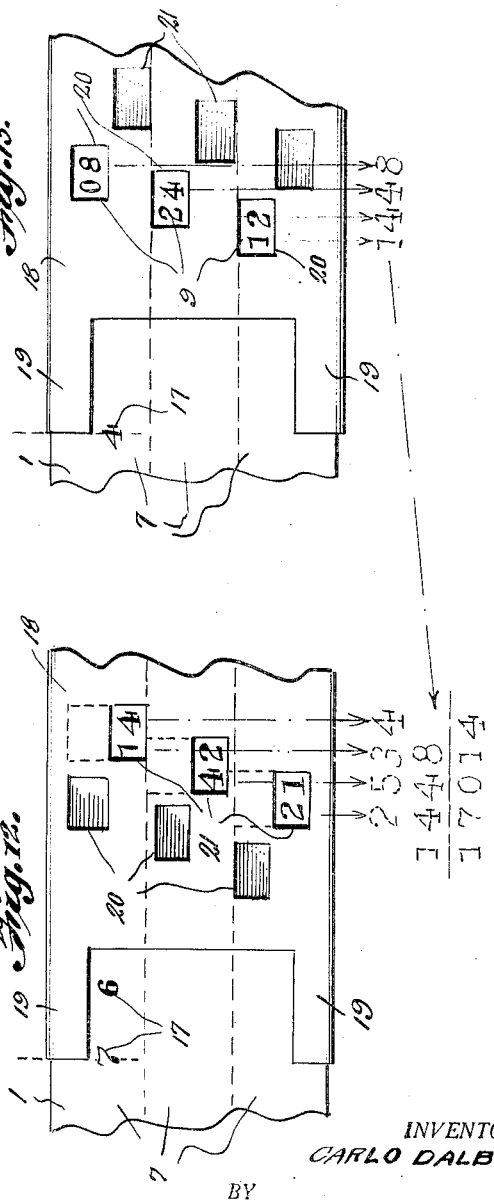
INVENTOR.
CARLO DALBONI Jan. 17, 1950  C. DALBONI  2,494,609
CALCULATOR
Filed June 13, 1946  4 Sheets-Sheet 4

INVENTOR.
CARLO DALBONI

Patented Jan. 17, 1950

2,494,609

UNITED STATES PATENT OFFICE 2,494,609

CALCULATOR

Carlo Dalboni, New York, N. Y.

Application June 13, 1946, Serial No. 676,441

3 Claims. (Cl. 235—69)

1

This invention relates to a slide rule and it is one object of the invention to provide a device of this character by means of which multiplication and other problems in arithmetic may be easily and quickly solved.

Another object of the invention is to provide a slide rule by means of which problems in arithmetic will be reduced to addition of figures which are assembled in position for adding by proper manipulation of the slide rule.

Another object of the invention is to provide a slide rule wherein numbers are arranged in predetermined order upon strips slidably mounted in an elongated casing or hollow bar so that by shifting the strips longitudinally certain of the numbers will be displayed through openings in the casings and so arranged that they may be added and the problem solved.

Another object of the invention is to provide a slide rule wherein the strips may be very easily and accurately moved into position for solving a problem.

Another object of the invention is to provide a slide rule which is of simple construction and useful to school children, accountants, engineers and others who desire a quick and convenient way of solving arithmetic problems.

The invention is illustrated in the accompanying drawings wherein:

Fig. 1 is a view looking down upon a slide rule of the improved construction.

Fig. 2 is an edge view of the slide rule.

Fig. 3 is a longitudinal sectional view taken along line 3—3 of Fig. 1.

Fig. 4 is a transverse sectional view taken along line 4—4 of Figure 1.

Fig. 5 is a sectional view taken along line 5—5 of Figure 1.

Fig. 6 is a sectional view taken along line 6—6 of Figure 1.

Fig. 7 is a view of one of the strips which is slidably mounted in the casing.

Fig. 8 is a sectional view upon an enlarged scale taken along line 8—8 of Figure 7.

Fig. 9 is a view showing the strips slid to an extended position.

Fig. 10 is a fragmentary view upon an enlarged scale showing the strips extended.

Fig. 11 is a view similar to Figure 9 showing a slide plate shifted to another position upon the casing.

Fig. 12 is a view illustrating the first step when multiplying by a number having two numerals.

Fig. 13 is a view similar to Figure 12 showing the second step.

2

Fig. 14 shows a slide rule of modified construction.

Fig. 15 shows the computing strips of Figure 14 moved to set positions.

Fig. 16 is a view of one of the computing strips.

The casing is open at one end but its other end is closed by a block 6 which is formed integral with the strip and the ribs 4 and serves as an abutment for inner ends of computing strips 7 which fit within the casing in side by side relation to each other and are of such length that when their inner ends are in engagement with the abutment block closing one end of the casing finger holds 7' at their outer ends will project from the open end of the casing. In the present illustration there have been shown three computing strips but it will be understood that as many as desired may be provided. The finger hold of the center strip is straight throughout its length but the finger holds of the strips at opposite sides of the center strip have their outer end portions extending diagonally away from the finger hold of the center strip. Therefore the strips may be readily grasped by the finger holds at their outer ends and individually shifted longitudinally out of the casing.

Each of the computing strips has upon a side face thereof series of numerals which are arranged in groups which are indicated by the numbers 8. These groups each consist of upper and lower lines of numbers 9 and 10, the numerals of line 10 being so colored that they contrast with the numerals of the line 9. It is preferred to have the numerals of the line 9 black and those of the line 10 red but it will be understood that any contrasting colors may be used. Transversely extending slots 11 are formed in the cover strip 3, for exposing certain numbers of the groups 9 and 10, and these slots have been formed in stepped formation and spaced from each other longitudinally of the casing as shown in Figure 1. Near the open end of the casing the cover strip is formed with a large opening 12 of such length that when the computing strips are thrust fully into the casing lines of numbers 13 arranged in sequence upon outer end portions of the strips will be displayed through this opening. Each line of numbers 13 has zero marks between its numbers and through these zero marks there have been formed small openings 14 to receive a pencil point or the like used for adjusting the computing strips and accurately moving them to predetermined positions of adjustment. When a pin or pencil point is engaged in an opening 14 and the computing strip shifted longitudinally the pin or pencil point will make contact with the cross strip 15 constituting the outer end of the cover strip 3 and the computing strip brought to a stop with a predetermined number of the series 13 near the inner edge of the cross strip. The computing strips are successively slid longitudinally to bring selected numbers of their numbers 13 into position under the selected number of the first strip moved and thus form the number to be multiplied. This is clearly shown in Figure 10 and referring to this figure it will be seen that the number to be multiplied is 362. If so desired the computing strips may be grasped by the finger holds 7' at their outer ends and shifted longitudinally. These finger holds are also used for thrusting the computing strips inwardly to their normally retracted positions. Pointers 16 extend from the end bar or strip 15 longitudinally of the opening 12 and the lines of numbers 13 move between these pointers as the computing strips are moved longitudinally. Therefore the lines of numbers on the computing strips will be set off from each other.

The cover strip 3 bears upon its outer surface numbers 2 through 9. These numbers which are indicated by the number 17 are arranged in groups of two to a group and the groups so spaced from each other longitudinally of the cover strip that by sliding a shield 18 along the casing until the arms 19 formed at one end of the shield are in registry with a selected one of the numbers 17 predetermined ones of the numbers 9 or 10 will be displayed through openings 20 and 21 formed through the shield. The openings 20 and 21 are in staggered relation to each other and by referring to Figures 12 and 13 it will be seen that the numbers 9 will be displayed through the openings 20 and the numbers 10 displayed through openings 21. It has previously been stated that the number to be multiplied is 362 and it will now be assumed that this number is to be multiplied by the number 47. Therefore the number 362 is first to be multiplied by 7 and in order to do so the slide is shifted along the casing until the arms 19 have their ends even with the number 7 on the outer or front face of the cover sheet. With the shield in this position, which is shown in Figures 9 and 12, the numbers 14, 42 and 21 are displayed through the openings 21 of the shield in vertical columns and they may be added in the usual manner and the result will be 2534. This number is written upon a sheet of paper and the shield then shifted along the casing until ends of its arms are even with the number 4 on the cover sheet. This position is shown in Figures 11 and 13 and the numbers 8, 24, and 12 will be displayed through the openings 20 in position to form columns and they may be added to produce the number 1448 shown in Figure 13. This number 1448 is now written upon the sheet of paper under the number 2534 in proper position for addition and when the two numbers are added the result obtained is 17,014. This is the correct answer obtained when 362 is multiplied by 47 and by use of the slide scale the answer may be quickly obtained and mistakes will not be made which occur due to inaccurate multiplication. If the number 62 is to be multiplied only the two upper strips 7 will be shifted along the casing, and it will be readily understood that by providing additional computing strips larger numbers may be multiplied. Since the finger grips 7' of the upper and lower computing strips extend diagonally in opposite directions mistakes will not be made when replacing them if they are withdrawn from the casing. The shield 18 is formed from a sheet of metal having portions bent to form side flanges 22 which overlap the rear face of the main strip 2, and by bending the sheet of metal to form a lip 23 at the end of the shield, the shield will be prevented from scraping or catching when slid along the casing.

In Figures 14 and 15 there has been illustrated a slide rule of modified construction.

In this embodiment of the invention the casing 24 which may be formed of metal or other suitable material and has front and rear walls, the front wall being formed with a rectangular opening near one end and with a series of transversely extending slots 26 spaced from each other longitudinally of the casing. The casing is open at the end near which the opening 25 is located for reception of computing strips 27 which are slidable longitudinally into and out of the casing through this open end of the casing, it being understood that the other end of the casing may be closed or open as desired when manufacturing. Numbers 28 are provided upon the outer face of the front wall of the casing and progress from 2 to 9 and designate slots through which numbers upon the computing strips are to be observed when multiplying. Each of the computing strips bears two series of numbers 29 and 30 in consecutive order from 0 to 9 and 0 to 8 respectively, the line of numbers 30 being accompanied by openings 31. When the computing strips are in the retracted position shown in Figure 14 the series or line of numbers 29 is displayed through the opening 25 and as the strips are shifted outwardly the series or line of numbers 30 appear beyond the open end of the casing and by inserting a pencil point or the like into an opening 31 accompanying a selected one of the numbers in the line 30 the corresponding number of the line 29 may be accurately brought into position close to the outer side edge of the opening 25. Each computing strip also bears lines or series of numbers 32 and 33 which are of contrasting colors, black and red being preferably used, and it will be noted that when the strips are in place within the casing the series of numbers colored black are next to each other and the series of numbers colored red are next to each other. Attention is also called to the fact that the numbers forming the various series follow the multiplication tables from the two table through the nine table. In order to multiply the numbers 362 by 47 it is merely necessary to slide the strips outwardly until the numbers 3, 6 and 2 of the lines of numbers 29 of the lower, middle and upper strips are disposed in a vertical column close to the outer side edge of the opening and form the number 362 which is to be multiplied and then observe the numbers showing through the slots identified by the numbers 7 and 4. This is shown in Figure 15, and referring to this figure it will be seen that at the top of the column close to the right hand side edge of the slot identified by the number 7 appears a black number 4. Under this are two red numbers 1 and 2 which added together produce the number 3. The next two numbers 4 and 1 are black and when added together produce the number 5 and at the bottom of the column is a red number 2. These numbers are written in successive order upon a sheet of paper and produce the number 2534 which is the result of multiplying 362 by 7. In like manner the number in the right hand column appearing through the slot identified by the number 4 produces the number 1448 and when the number is placed under the number 2534, one space to the left, and the two numbers added they produce 17,014 which is the correct answer obtained when 362 is multiplied by 47.

In each embodiment of the invention there has been provided strips bearing series of numbers constituting multiplication tables and lines of numbers in series from 0 to 9 so that the strips may be accurately moved longitudinally to positions in which multiples of the number to be multiplied by a predetermined number will appear through the slots of the casing in such relation to each other that they may be added and the correct answer obtained.

While two embodiments of the invention have been illustrated and described it will be understood that the invention may be embodied in other specific constructions and arrangements of parts and that the device when manufactured may be of various dimensions adapting it for use upon a desk or to be placed in a pocket. It will also be understood that the device may have various numbers of computing strips according to its dimensions.

Having described the invention, what is claimed is:

1. A calculator comprising an elongated casing open at an end and consisting of a main strip having forwardly projecting ribs along its side edges and a block extending across one end, a cover strip secured upon the side ribs and upon a block carried by the main strip, said block closing an end of the casing, the cover strip being formed with a large longitudinally extending opening adjacent the open end of the casing and with transversely extending slots spaced from each other longitudinally of the cover strip, each slot being cut to form transversely offset stepped portions, computing strips extending longitudinally in said casing in side by side relation to each other and being shiftable longitudinally through the open end of the casing, said computing strips having upon their front faces upper and lower longitudinally extending lines of numbers and adjacent their outer ends each having its front face provided with a line of figures in consecutive order, openings being formed through computing strips between numbers of the last mentioned line of numbers whereby a longitudinally extending shifting member may be engaged in an opening adjoining a selected number and the computing strips shifted longitudinally to dispose selected ones of the last mentioned numbers in a column one under another at the outer end of the elongated opening of the cover strip and cause predetermined upper and lower numbers on the computing strips to be displayed in columns through the slots of the cover strip, and a shield carried by and slidable longitudinally along the casing and formed with staggered openings moved into position to expose predetermined numbers displayed through the slots of the cover strip when the inner end of the shield is even with a selected one of a series of numbers provided upon the outer face of the cover sheet.

2. A calculator comprising an elongated casing open at one end and having a front wall formed with transverse slots cut to provide stepped portions, the front wall being also formed with a large longitudinally extending opening adjacent its open end, computing strips slidable longitudinally in the casing through the open end thereof and disposed in side by side relation to each other one above another and having on their front faces upper and lower longitudinally extending rows of numbers for progressive display through the stepped portions of said slots as the strips are moved longitudinally, the strips also having upon their front faces longitudinally extending rows of numbers arranged in consecutive order and all displayed through the elongated opening of the casing when the computing strips are in a retracted position, the computing strips being formed with openings adjoining the numbers of the last mentioned rows for receiving a member serving as means for sliding the computing strips longitudinally and disposed selected numbers in a column one above another at the outer end edge of the elongated opening in the casing and predetermined numbers of the upper and lower rows in position for display through the steps of the slots, and a shield carried by and slidable along said casing and formed with offset openings for registering with predetermined upper and lower portions of the offset portions of the slots and thereby displaying numbers arranged in vertical columns for addition.

3. A calculator comprising a casing open at an end and having a front wall formed with transverse slots spaced from each other longitudinally of the casing, the front wall being also formed with an elongated opening near its open end, computing strips slidable longitudinally in the casing through the open end thereof in side by side relation to each other and projecting from the open end of the casing, said strips having upon their outer faces longitudinally extending rows of numbers in position to be successively displayed through the slots as the strips are moved longitudinally, the strips being also provided near their outer ends with longitudinally extending rows of numbers all of which are displayed through the opening near the end of the casing when the strips are in a retracted position, means for controlling sliding of the computing strips longitudinally to move selected ones of the last mentioned rows of numbers into position one above another at the outer end of the opening in the casing and cause predetermined numbers to be displayed through the slots, and a shield carried by and slidable longitudinally along said casing and formed with vertical colums of offset openings for registering with portions of the slots in the casing and causing predetermined numbers to be displayed in vertical columns and form a problem in addition.

CARLO DALBONI.

REFERENCES CITED

The following references are of record in the file of this patent:

UNITED STATES PATENTS

| Number | Name | Date |
|---|---|---|
| 344,181 | Halsey | June 22, 1886 |
| 1,548,173 | Rockwell | Aug. 4, 1925 |
| 1,892,634 | Rubinsky | Dec. 27, 1932 |

FOREIGN PATENTS

| Number | Country | Date |
|---|---|---|
| 484,191 | France | June 21, 1917 |
| 196,001 | Great Britain | Apr. 13, 1923 |